(12) United States Patent
Zandbergen

(10) Patent No.: US 12,467,940 B1
(45) Date of Patent: Nov. 11, 2025

(54) SYSTEMS AND METHODS FOR HIGH-QUALITY JERK DATA

(71) Applicant: Movella Holdings B.V., Enschede (NL)

(72) Inventor: Raymond Zandbergen, Enschede (NL)

(73) Assignee: Movella Holdings B.V., Enschede (NL)

( * ) Notice: Subject to any disclaimer, the term of this patent is extended or adjusted under 35 U.S.C. 154(b) by 530 days.

(21) Appl. No.: 18/048,789

(22) Filed: Oct. 21, 2022

(51) Int. Cl.
*G01P 15/08* (2006.01)
*A61B 5/00* (2006.01)
*G01P 13/00* (2006.01)

(52) U.S. Cl.
CPC ............ *G01P 15/08* (2013.01); *A61B 5/4504* (2013.01); *A61B 5/7235* (2013.01); *G01P 13/00* (2013.01); *A61B 2562/0219* (2013.01)

(58) Field of Classification Search
None
See application file for complete search history.

(56) References Cited

U.S. PATENT DOCUMENTS

| | | | |
|---|---|---|---|
| 2018/0224930 A1* | 8/2018 | Folmer | G06T 13/20 |
| 2019/0060741 A1* | 2/2019 | Contreras | H04S 7/303 |
| 2022/0381564 A1* | 12/2022 | Kitchen | G07C 5/008 |
| 2023/0343458 A1* | 10/2023 | Ahmed | A61B 5/7282 |

* cited by examiner

*Primary Examiner* — Suman K Nath

(57) ABSTRACT

A method for an inertial measurement unit (IMU) coupled to a user includes determining, with a plurality of accelerometers in the IMU, a plurality of acceleration data in response to a movement by the user, computing, with a processor in the IMU, a plurality of gravity vector data in response to the plurality of acceleration data, computing, with the processor in the IMU, a plurality of jerk data in response to the plurality of acceleration data, and outputting, with the IMU, the plurality of gravity vector data and the plurality of jerk data to an external processing unit.

20 Claims, 3 Drawing Sheets

SYSTEMS AND METHODS FOR HIGH-QUALITY JERK DATA

BACKGROUND

The present invention relates generally to apparatus for motion capture of physical performances of subjects. More specifically, the present invention relates to motion capture methods and apparatus with increased performance.

With some motion capture systems provided by Xsens, the assignee of the present patent application, users attach specialized motion capture devices (also known as inertial measurement units, "IMUs") to multiple points on their body. As the users move, the users' motions are captured by accelerometers or other sensors within the motion capture devices. In IMUs manufactured by Xsens, accelerometers typically sample accelerations in one of multiple orthogonal axes at a sampling rate of about 0.5 kHz to 5 kHz and are sensitive to movement to 0.1 Hz. Because these devices are extremely sensitive, the raw acceleration data coming from the accelerometers is often very noisy or jittery. To reduce this noise, in Xsens IMUs, raw acceleration data is often filtered with a low pass filter to smooth the acceleration data in time. The IMU typically further process the smoothed acceleration data to return a series of acceleration vectors. The accelerometer vector data are then provided to an external device for further processing and storage. The raw acceleration data is typically very large compared to the acceleration vector data, accordingly that amount of data transmitted (and bandwidth) to the external device may be kept relatively lower.

Problems with the above paradigm include that the inventors of the present invention believe that accelerometer vector data output from IMUs are not accurate enough for certain types of motion analysis. For example, because the raw acceleration data is smoothed and processed to become acceleration vector data prior to sending to the external device, the inventors believe that this acceleration vector data is suboptimal for motion analyses requiring higher-frequency or higher-resolution data.

In light of the above, what is desired are improved motion capture systems without the drawbacks described above.

SUMMARY

The present invention relates generally to apparatus for motion capture of physical performances of subjects. More specifically, the present invention relates to apparatus providing increased motion capture performance.

In some embodiments, the inventors desire to perform a type of motion analysis known as jerk, typically the first derivative of acceleration data with respect to time. Jerk analysis is often used to determine when the user directly or indirectly contacts something, such as the user touching a wall, the user stepping on a floor, the user contacting (e.g. hitting, catching or being hit by) an object, or the like. Further analysis examples are provided below. In some embodiments, to determine jerk, an IMU outputs accelerometer vector data to an external processor. The external processor then performs the jerk computations. As noted above, because the accelerometer vector data is processed and smoothed in time by the IMU, if an external processor were to compute jerk based upon the output accelerometer vector data, the jerk may not accurately reflect the user's interactions.

In some embodiments, to increase the accuracy of the user's contacts, an IMU may be internally programmed to perform some if not all of the jerk computations internally. The jerk computations as well as the accelerometer vector data, discussed above, may then be output to the external processor. Because the jerk computations are performed upon the acceleration data prior to it being significantly processed by the IMU, this IMU determined jerk computations are believed to be substantially more accurate.

According to one aspect, a method for an inertial measurement unit (IMU) coupled to a user is disclosed. A technique may include determining, with a plurality of accelerometers in the IMU, a plurality of acceleration data in response to a movement by the user, and computing, with a processor in the IMU, a plurality of gravity vector data in response to the plurality of acceleration data. A process may include computing, with the processor in the IMU, a plurality of jerk data in response to the plurality of acceleration data, and outputting, with the IMU, the plurality of gravity vector data and the plurality of jerk data to an external processing unit.

According to another aspect, an inertial measurement unit (IMU) coupled to a user is disclosed. A device may include a plurality of accelerometers configured to determine a plurality of acceleration data in response to a movement by the user, and a processor coupled to the plurality of accelerometers configured to determine a plurality gravity vector data in response to the plurality of acceleration data, configured to determine a plurality of jerk data in response to the plurality of acceleration data. An apparatus may include an output interface configured to output the plurality of gravity vector data and the plurality of jerk data to an external processing unit.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
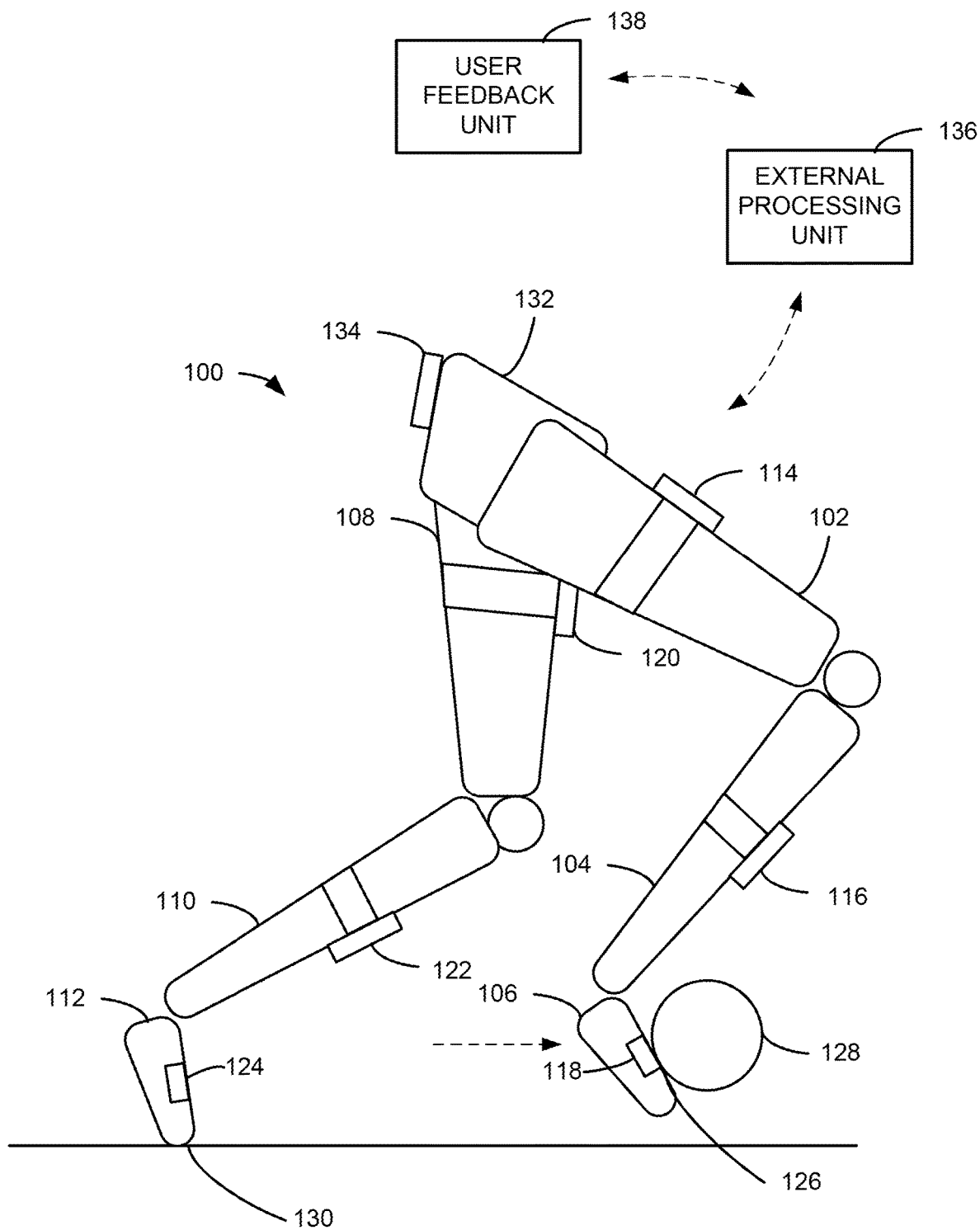
FIG. 1 illustrates an example configuration according to some embodiments.

FIG. 1 illustrates an example configuration according to some embodiments. More specifically, FIG. 1 illustrates a portion of a subject 100 including segments 102, 104 and 106 that are portions of subject 100 (e.g. right leg) and segments 108, 110 and 112 (e.g. left leg). An inertial measurement unit (IMU) 114 is coupled segment 102, an IMU 116 is coupled segment 104 (e.g. next to the shin), an IMU 118 is coupled segment 106, an IMU 120 is coupled segment 108, and an IMU 122 is coupled segment 110 (e.g. next to the shin), and an IMU 124 is coupled to segment 112. Also shown is a segment 132 (e.g. pelvis) having an IMU 134 coupled thereto (e.g. attached to the skin near the tailbone). IMUs may be attached to subject 100 via elastic straps, Velcro, clips, adhesive or may be embedded or attached within a garment, or the like. An external processing unit 136 and a user feedback unit 138 are also illustrated and coupled to the IMUs.

In various embodiments, subject 100 may be a human, an animal, or any other object where motion capture is desired, e.g. a robot, a vehicle, or other object. Typically segments of subject 100 may be geometric portions of an object, e.g. lower leg, upper leg, forearm, sternum, or the like, that typically do not appreciably bend or flex. Joints are illustrated disposed between segments that facilitate adjacent segments bending, twisting, extending, compacting, or the like relative to each other.

In this example, segment 106 of subject 100 (e.g. right foot) is shown making contact 126 with an external object 128 (e.g. soccer ball), and segment 112 of subject 100 (e.g. left foot) is shown pushing off of an external object 130 (e.g. a floor).

In various embodiments, motion tracking systems provided by Movella, the assignee of the present application are used, although it is expected that motion tracking units from other vendors may also be configured to implement various functionality described herein. Inertial unit (IMU) systems, typically include three-dimensional accelerometers, three-dimensional gyroscopes, a processor, and a transmitter, or the like. In some embodiments, the systems may also include functionality such as magnetometers, pressure sensors, temperature sensors, and the like. In some embodiments, the output data for each IMU may include data such as: orientation data, velocity data, and jerk data, as discussed herein.

The above-described embodiments of FIG. 1 are just one possible system configuration. It is expected that one of ordinary skill in the art will recognize that there are many possible configurations that are within the scope of embodiments of the present invention. For example, where and how the IMUs are coupled to the performer can vary depending upon engineering preference.

In the embodiments illustrated in FIG. 1, to facilitate the determination of vector data and the like from the different IMUs, an external processing unit 136 is provided. As will be discussed below, certain types of algorithms may be processed on-board within IMUs, and other types of computationally intensive algorithms depending upon data from multiple IMUs may be processed external to the IMUs, i.e. by processing unit 126. In various embodiments, IMUs and external processing unit 126 (e.g. integrator units 126) may be coupled via a wired connection or wireless mechanism. As described herein, types of movement algorithms based upon the orientation data, velocity data, jerk data, or the like may include characterization of the user's stride length, foot contact time, tibial acceleration, braking force, shock attenuation, step rate, speed, vertical displacement, and the like.

In some embodiments a user-feed back unit 138 may be used to provide the user with feedback based upon the movement algorithms processed by external processing unit 136. Types of feedback may include images or text, sounds, vibrations, and the like. User feedback unit 138 may be a smart phone, fitness tracker, smart watch, headphones, smart glasses, or the like. In some embodiments, external processing unit 126 and user-feedback unit 138 may be combined into one device such as a smart phone, smart watch, laptop, or the like, and perform the actions described herein.

Figure 2:
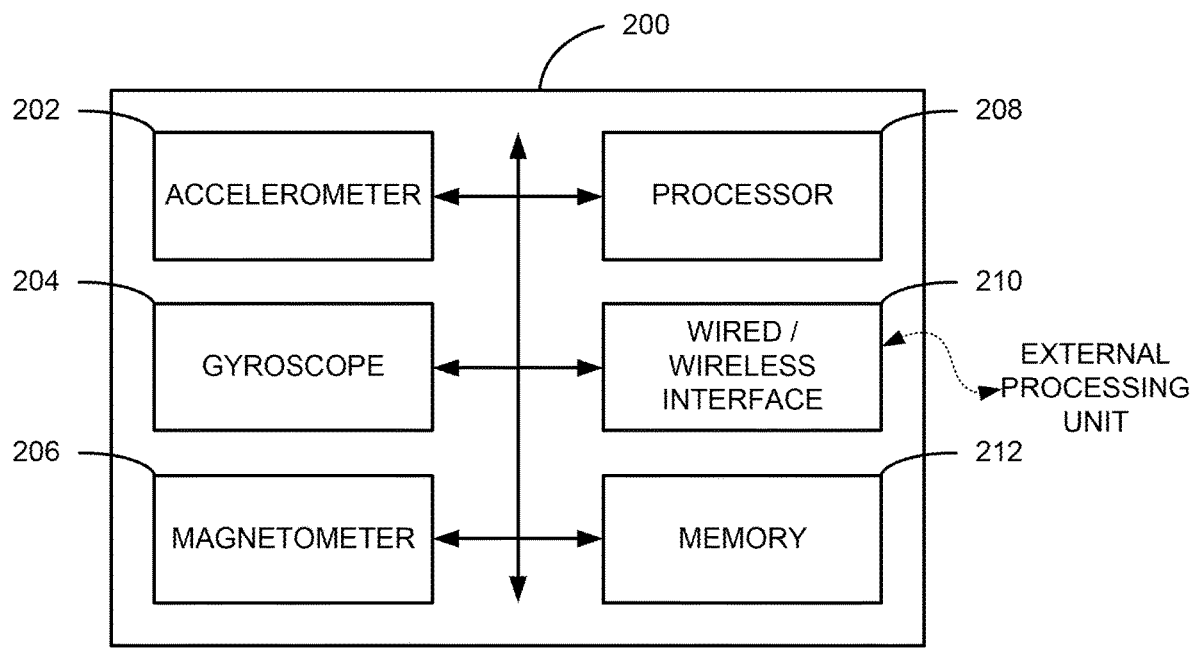
FIG. 2 illustrates a block diagram according to some embodiments.

FIG. 2 illustrates a block diagram according to one embodiment. More specifically, FIG. 2 illustrates a block diagram of an inertial measurement unit (IMU) 200, as discussed above. In various embodiments, IMUs may include a 3D gyroscope (202), and a 3D accelerometer (204), which provides angular velocity and acceleration measurements respectively. In some cases, the IMU may also include additional devices such as a 3D magnetometer (206) to provide heading information in the global frame, a pressure sensor, temperature sensors, and the like. In various embodiments, IMUs may also include a processing unit (208), a wired or wireless interface 210, a power supply (e.g. battery), and a memory 212 for storing programs. Such programs may include instances of algorithms that combine high-rate accelerometer data, gyroscope data, and the like into estimates of the sensor orientation, velocity, force vectors, gravity vectors, heading vectors, or the like for subject 100. Programs may also compute jerk data within the IMU described herein based upon the high-rate accelerometer data.

In various embodiments, the data computed within the IMU may be transmitted to a remote, external processing unit via a wired connection (e.g. serial or parallel) or wireless mechanism, (e.g. Bluetooth, Zig-Bee, Ultrawide band (UWB), Wi-Fi, radio frequency). By determining the estimates of orientation, velocity, jerk and the like on board the IMU, the amount of data passed from the IMU to the external processing unit is greatly reduced, and thus the data bandwidth requirements is reduced.

As discussed above, the IMU may include and perform a number of processing algorithms based upon the captured data. In some instances, strapdown integration (SDI)-based algorithms are used, such as those provided by the assignee of the present patent application, to facilitate determination of the orientation and velocity data for a segment, and the like. These SDI processes may provide more accurate numerical integrations, especially in cases when the input data are not necessarily synchronous in time. Additionally, as discussed above, jerk computations performed in the IMU based upon high-rate accelerometer data can be accurate and precise. In various embodiments, other computationally intensive algorithms and algorithms combining data from multiple IMUs can be implemented by the external processing unit.

Figure 3A:
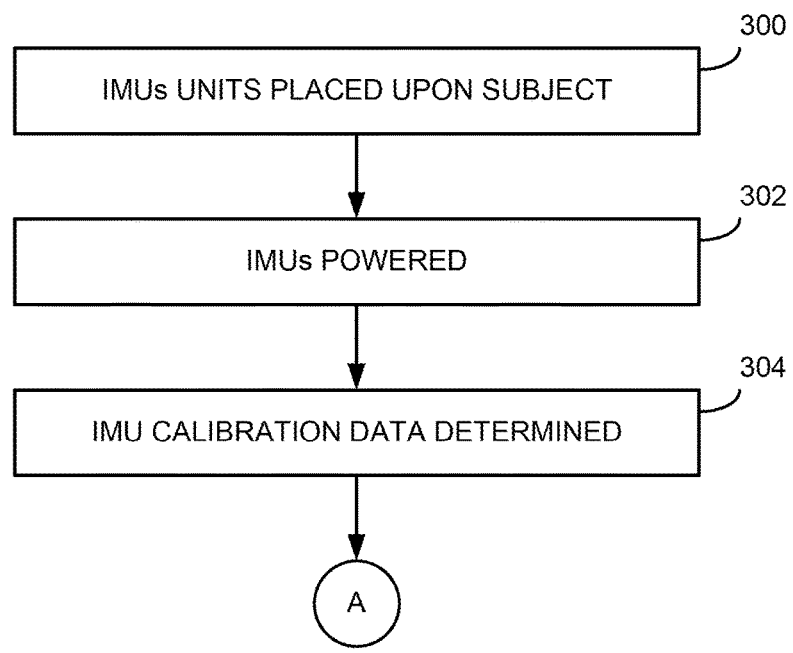
FIGS. 3A-3B illustrate a process diagram according to various embodiments of the present invention.
Figure 3B:
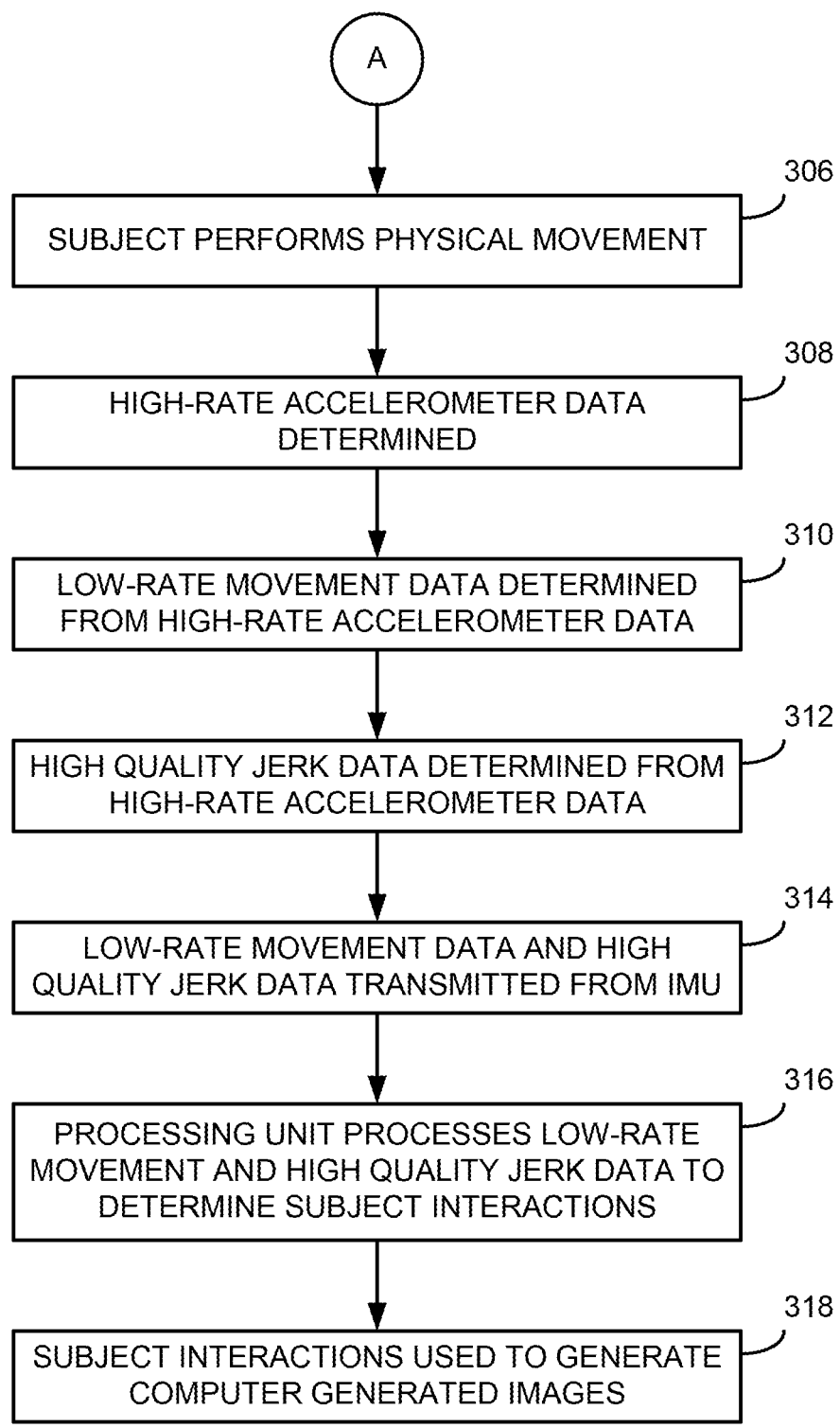

FIGS. 3A-B illustrate a process diagram according to various embodiments of the present invention. For sake of convenience and understanding, references to FIG. 1 will be given, below.

Initially, IMUs e.g. 114-124 may be disposed upon the subject 100, step 300. Next, in various embodiments, the IMUs e.g. 114-124 may be powered on, step 302, and calibrated, step 304. The calibration processes may be performed by the external processor 126 based upon data provided by the IMUs 114-124 using techniques described in the above-mentioned referenced patent application, and others.

Next, in various embodiments, subject 100 performs physical actions, step 306. For example, a human subject can jump, dance, kick a ball, an animal may rear-up or run, a robotic machine may operate, and the like. During these performances, the sensing elements (e.g. accelerometer, gyroscope, etc.) with IMUs e.g. 114-124 sense the physical perturbations, step 308. As an example, accelerometers will determine a high-bitrate data streams, based upon changes in capacitance, resonant frequency, or the like, of the accelerometers.

In response to sensed data, e.g. high-bit rate accelerometer, gyroscope data, magnetic field data, or the like, the sensed data is processed within the IMU, e.g. 114-124, step 310. In some examples, smoothing algorithms and one or more estimation algorithms are used to determine estimates of orientation, acceleration, or the like. The estimates may be a series of gravity vectors, magnetic strength vectors, or the like. In some embodiments, algorithms such as a Kalman filter, a particle filter, or the like may be used to perform such estimations, and low-pass filters, or the like may be used to reduce transient noise, jitter or the like. The estimates of orientation, acceleration, or the like have lower-bit rates compared to the unprocessed sensor data.

In additional embodiments, in response to sensed data, e.g. high-bit rate accelerometer, gyroscope data, magnetic field data, or the like, the sensed data is processed within the IMU, e.g. 114-124, to determine jerk data step 312. In some examples, a first derivative of the high-bit rate sensor data (e.g. accelerometer, gyroscope, magnetic field) is performed by the respective IMUs to determine the high-quality jerk data. In various embodiments, the jerk data may describe a shape and timing of jerk peaks using Dirac or Gaussian parameters, jerk steps, peaks and derivatives to spectral and wavelet content, or the like. These quantities may be rotation-compensated using high bit-rate sensor data. Additionally, Mu-law encoding may be used in some embodiments.

In various embodiments, the IMUs, e.g. 114-124, outputs the IMU data to the external processor 126, step 314. As discussed above, some embodiments the IMUs may use a wired connection or wireless channel to output the motion data and the high-quality jerk data to external processor 126.

In some embodiments, the motion data and the high-quality jerk data is then used within the external processor to determine when the user is interacting with an external object, step 316. Referring to the example illustrated in FIG. 1, in one example, the high-quality jerk data from IMU 118 may be used to determine when the foot 106 of subject 100 makes contact 126 with a ball 128; the high-quality jerk data from IMU 124 may be used to determine when the foot 112 breaks contact 130 with the ground, while subject 100 is running; and the like.

In various embodiments, the determination of when the subject interacts with external objects (using the high-quality jerk data) may be used as input data for computer-generated graphics animation and models, step 318. For example, the determination may be used as a basis for generation of automated characters in a video game, may be used as a basis of characters in an animated feature, may be used for motion studies or ergonomics studies, may be used for subject movement characterization, and the like.

Further embodiments can be envisioned to one of ordinary skill in the art after reading this disclosure. For example, applications may be applied to monitor the subject's interactions with external objects. In some cases, the interactions may include the subject moving and hitting the external object. As examples, the subject may hit a golf ball, kick a soccer ball, strike another subject, or the like, the subject may touch with a wall, push a switch, push surface, push their finger on a piano key or instrument string, or the like, the subject may step on a floor, a stair, or other object, or the like. In some cases the interactions may include the external object hitting the subject. As examples, the subject may be hit by a ball, baton, moving vehicle, explosive device, gust of wind and the like. In some cases, the interactions may include the external object moving and the moving subject contacting each other. As examples, the subject may hit a spiked volleyball, a pitched cricket ball, a smashed shuttle cock, or the like, the subject may catch a thrown rugby ball or football, or the like. In some cases the interactions may include the subject disengaging with an object. As examples, the subject may throw a baseball, football, or the like, the subject may release a bowstring, let go of a rope, push off another object or surface, or the like.

Other applications may be applied to monitor for internal events of the subject. For example, for a living subject, the internal events may include a broken bone, torn ligament, torn tendon, joint dislocation, "cracking" knuckles or joints, muscle spasms, tremors, seizures or cramps, and the like. In other examples, for a mechanical subject, such as car, the internal events may include blown tires, broken clamps, struts and supports, blown gaskets or rods, engine sputtering, misfiring or backfiring, and the like, for a robotic device, the internal events may include hitting a wall, surface, work piece, or the like, a blown hydraulic line, a seized motor, and the like.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

I claim:

1. A method for measuring movement of a user with an inertial measurement unit (IMU) comprising:
   determining, with a plurality of accelerometers in the IMU, a plurality of high bit-rate acceleration data in response to a movement by the user;
   determining, with a processor in the IMU, a plurality of low bit-rate acceleration data in response to the plurality of acceleration data;
   computing, with the processor in the IMU, a plurality of gravity vector data in response to the plurality of low bit-rate acceleration data;
   computing, with the processor in the IMU, a plurality of jerk data in response to the plurality of high bit-rate acceleration data; and
   outputting, with the IMU, the plurality of gravity vector data and the plurality of jerk data to an external processing unit.

2. The method of claim 1 wherein the computing, with the processor in the IMU, the plurality of jerk data comprises computing, with the processor in the IMU, the plurality of jerk data in response to a first derivative of the plurality of high bit-rate acceleration data.

3. The method of claim 1
   wherein the movement by the user comprises the user interacting with an object that is external to the user; and
   wherein the object is selected from a group consisting of: a floor, a wall, a surface, a moving object, a stationary object.

4. The method of claim 1 wherein the movement by the user comprises the user disassociating from an object.

5. The method of claim 1
   wherein the plurality of jerk data is associated with an event internal to the user; and
   wherein the internal event is selected from a group consisting of: a broken bone, a soft tissue injury.

6. The method of claim 1 wherein the outputting, with the IMU, the plurality of gravity vector data and the plurality of jerk data to the external processing unit comprises transmitting, with a wired or wireless interface of the IMU, the plurality of gravity vector data and the plurality of jerk data to the external processing unit.

7. The method of claim 6 wherein a wireless interface is selected from a group consisting of: Bluetooth, Wi-Fi, Zigbee, Ultrawide band, rf.

8. An inertial measurement unit (IMU) coupled to a user comprising:
- a plurality of accelerometers configured to determine a plurality of high bit-rate acceleration data in response to a movement by the user;
- a processor coupled to the plurality of accelerometers configured to determine a plurality of low bit-rate acceleration data in response to the plurality of high bit-rate acceleration data, configured to determine a plurality gravity vector data in response to the plurality of low bit-rate acceleration data, and configured to determine a plurality of jerk data in response to the plurality of high bit-rate acceleration data; and
- an output interface configured to output the plurality of gravity vector data and the plurality of jerk data to an external processing unit.

9. The IMU of claim 8 wherein the processor is configured to determine the plurality of jerk data in response to a first derivative of the plurality of high bit-rate acceleration data.

10. The IMU of claim 9
- wherein the movement by the user comprises the user interacting with an object that is external to the user; and
- wherein the object is selected from a group consisting of: a floor, a wall, a surface, a moving object, a stationary object.

11. The IMU of claim 8 wherein the movement by the user comprises the user disassociating from an object.

12. The IMU of claim 8
- wherein the plurality of jerk data is associated with an event internal to the user; and
- wherein the internal event is selected from a group consisting of: a broken bone, a soft tissue injury.

13. The IMU of claim 8 wherein the output interface is coupled via wires to the external processing unit.

14. The IMU of claim 8
- wherein the output interface is wirelessly coupled to the external processing unit; and
- wherein the output interface is selected from a group consisting of: Bluetooth, Wi-Fi, Zigbee, Ultrawide band, rf.

15. A motion capture system coupled to a user comprising:
- an inertial measurement unit (IMU) comprising:
  - a plurality of accelerometers configured to determine a plurality of high bit-rate acceleration data in response to a movement by the user;
  - a processor coupled to the plurality of accelerometers configured to determine a plurality of low bit-rate acceleration data in response to the plurality of high bit-rate acceleration data, configured to determine a plurality gravity vector data in response to the plurality of low bit-rate acceleration data, and configured to determine a plurality of jerk data in response to the plurality of high bit-rate acceleration data; and
  - an output interface configured to output the plurality of gravity vector data and the plurality of jerk data to an external processing unit; and
- an external processing unit coupled to the IMU, wherein the external processing unit is configured to receive the plurality of gravity vector data and the plurality of jerk data, wherein the external processing unit is configured to determine physical contact of the user in response to the plurality of jerk data.

16. The system of claim 15
- wherein the physical contact of the user comprises the user interacting with an object that is external to the user; and
- wherein the object is selected from a group consisting of: a floor, a wall, a surface, a moving object, a stationary object.

17. The system of claim 15 wherein the physical contact of the user comprises the user disassociating from an object.

18. The system of claim 15
- wherein the physical contact of the user comprises an internal event of the user; and
- wherein the internal event is selected from a group consisting of: a broken bone, a soft tissue injury.

19. The system of claim 15 wherein the output interface comprises a wired interface.

20. The system of claim 15
- wherein the output interface comprises a wireless interface selected from a group consisting of: Bluetooth, Wi-Fi, Zigbee, Ultrawide band, rf.

* * * * *